United States Patent [19]

Koizumi et al.

[11] 4,050,812
[45] Sept. 27, 1977

[54] LIGHT SHIELD CURTAIN ASSEMBLY FOR RECIPROCATING OPTICAL SCANNING HEAD

[75] Inventors: Yutaka Koizumi; Yoshiharu Iwanaga, both of Tokyo, Japan

[73] Assignee: Ricoh Co., Ltd., Tokyo, Japan

[21] Appl. No.: 674,351

[22] Filed: Apr. 7, 1976

[30] Foreign Application Priority Data

Apr. 15, 1975  Japan ............................. 50-50843[U]

[51] Int. Cl.² .......................................... G03G 15/04
[52] U.S. Cl. ........................................ 355/66; 355/8; 355/67
[58] Field of Search ............ 355/8, 18, 50, 51, 64–67, 355/84; 354/242, 243, 241, 146, 205

[56] References Cited

U.S. PATENT DOCUMENTS

| | | | |
|---|---|---|---|
| 650,787 | 5/1900 | Wright et al. | 354/241 |
| 3,724,944 | 4/1973 | Sugita et al. | 355/67 X |

FOREIGN PATENT DOCUMENTS

4,830  2/1907  United Kingdom ................. 354/241

*Primary Examiner*—L. T. Hix
*Assistant Examiner*—Kenneth C. Hutchison
*Attorney, Agent, or Firm*—Frank J. Jordan

[57] ABSTRACT

First and second rollers extend perpendicular to the direction of reciprocation of the scanning head and are disposed on opposite sides of the scanning head in said direction. First and second curtains are fixed at first ends to the first and second rollers respectively and at second ends to the scanning head. The curtains are rolled around the respective rollers. First and second pulleys are fixed for rotation with the first and second rollers. A tensioned wire is fixed at its opposite ends to the first and second pulleys and rolled around the first and second pulleys in directions opposite to directions in which the first and second curtains are rolled around the first and second rollers respectively. As the scanning head is moved thereby unrolling one of the curtains, the pulleys and wire rotate the other roller so as to roll the other curtain thereonto.

6 Claims, 4 Drawing Figures

LIGHT SHIELD CURTAIN ASSEMBLY FOR RECIPROCATING OPTICAL SCANNING HEAD

BACKGROUND OF THE INVENTION

The present invention relates to a light sheild curtain assembly for a reciprocating optical scanning head of the type employed in an electrostatic copying machine.

In an electrostatic copying system, a scanning head is often employed which is reciprocatable adjacent to an original document for reproduction to expose a photoconductive member. Since the scanning head necessarily comprises a light source to illuminate the document, it is important that all light be prevented from reaching the photoconductive member except for that projected by the optical scanning system. For this reason, it is known to provide two rollers which extend perpendicular to the reciprocating direction of the scanning head and are disposed on opposite sides of the scanning head.

Two curtains are provided, each curtain being fixed at one end to and rolled around one of the respective rollers and being fixed at its other end to the scanning head. Spiral springs are associated with the rollers to urge the rollers to roll the curtains thereon. As the scanning head moves in one direction, it unwinds the curtain form one roller and the other curtain is rolled on the other roller by the respective spiral spring.

Whereas this prior art curtain arrangement is effective in shielding the photoconductive member from stray light, it suffers from several drawbacks. Since the springs must be wound and unwound by a great extent during each reciprocation of the scanning head, they have short service lives due to fatigue failure. They also lost their stiffness prior to failure, which tends to allow the curtains to slacken and lose their light shielding efficiency. Another cause of the springs losing their stiffness is that one of the springs must remain unwound while the copying apparatus is inoperative. If the springs are made initially stiffer to increase their service lives, there is the danger of tearing the curtains due to excessive tensile force coupled with the natural deterioration of the curtain material. In addition, such a spring loaded arrangement is relatively difficult to assemble.

SUMMARY OF THE INVENTION

It is therefore an important object of the present invention to provide a light shielding curtain assembly for an optical scanning head which comprises improved means for urging curtains to roll onto rollers which overcomes the disadvantages of the prior art.

It is another object of the present invention to provide a curtain assembly for an optical acanning head which comprises pulleys fixed for rotation with rollers on which curtains are respectively rolled and a wire rolled on the pulleys in directions opposite to directions in which the curtains are rolled on the rollers so that unrolling one curtain from one roller causes the other curtain to be rolled onto the other roller.

Other objects, together with the foregoing, are attained in the embodiments described in the following description and illustrated in the accompanying drawings.

DESCRIPTION OF THE PREFERRED EMBODIMENTS

While the curtain assembly of the present invention is susceptible of numerous physical embodiments, depending on the environment and requirements of use, substantial numbers of the herein shown and described embodiments have been made, tested and used, and all have performed in an eminently satisfactory manner.

Figure 1:
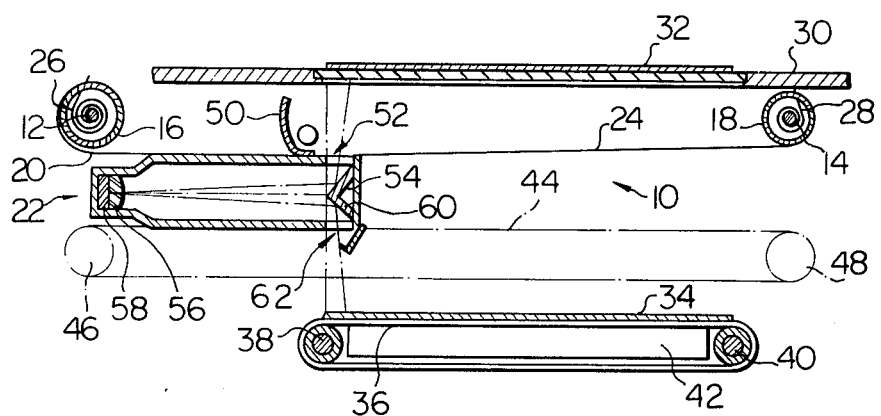
FIG. 1 is a longitudinal sectional view of a prior art curtain assembly associated with a scanning head of an electrostatic copying machine.

Referring now to FIG. 1, a prior art curtain assembly 10 to which the present invention constitutes an improvement comprises parallel fixed shafts 12 and 14. Rollers 16 and 18 are bored so as to be rotatably supported by the shafts 12 and 14 respectively. A curtain 20 is fixed to the roller 16 at one end and to an optical scanning head 22 at the other end. The curtain 20 is furthermore rolled on the roller 16. A curtain 24 is similarly fixed at one end to the roller 18 and at the other end to the scanning head 22, and rolled on the roller 18. A spiral spring 26 is connected between the shaft 12 and roller 16 which urges the roller 16 clockwise in FIG. 1 to roll the curtain 20 onto the roller 16 and remove any slack therefrom. A spiral spring 28 similarly urges the roller 18 counterclockwise to roll the curtain 24 onto the roller 18.

The scanning head 22 is typically reciprocatable between a glass platen 30 supporting an original document 32 face down for electrostatic reproduction and a photoconductive sheet 34 supported on a conveyor belt 36 driven by rollers 38 and 40. A suction box 42 preferably applies suction through holes (not shown) in the belt 34 to maintain the sheet 34 perfectly flat.

The scanning head 22 is driven for reciprocation in the left and right directions by a wire 44 fixed thereto and trained over drive pulleys 46 and 48. A light source 50 is fixed to the scanning head 22 to illuminate the underside of the document 32. The curtains 20 and 24 serve to keep stray light from the light source 50 from being incident on the sheet 34.

The scanning head 22 is formed with an exposure aperture 52, directly below which is disposed a plane mirror 54 oriented at approximately 45° to the horizontal. The mirror 54 reflects an image of the portion of the document 32 directly above the exposure aperture 52 through a converging lens 56 onto a plane mirror 58 disposed behind the converging lens 56, the converging lens 58 reflecting the image back through the converging lens 56 onto a plane mirror 60 also oriented at approximately 45° to the horizontal which reflects the image through a second exposure aperture 62 onto the sheet 34.

Figure 2:
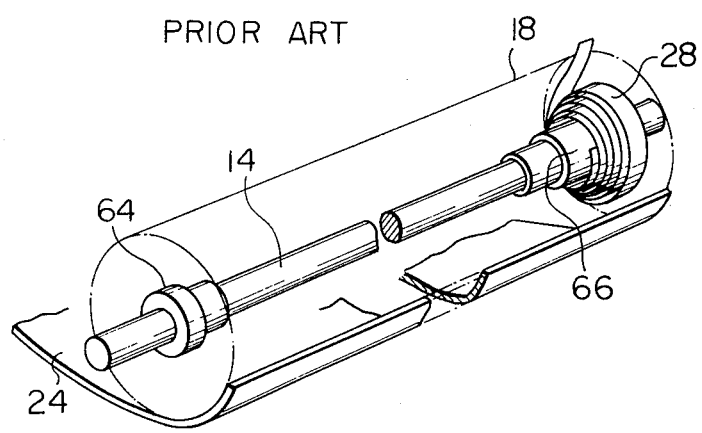
FIG. 2 is a perspective view, partly in section, of a spring arrangement for urging curtains of the assembly shown in FIG. 1 to roll on rollers.

The shaft 14, roller 18, spring 28 and curtain 24 are shown in enlarged scale in FIG. 2. Bearings 64 and 66 are preferably provided between the shaft 14 and roller 18, and similar bearings are provided for the shaft 12 and roller 16 although not shown.

As the scanning head 22 is moved rightward in FIG. 1 by the drive pulleys 46 and 48 and wire 44, the scanning head 22 unrolls the curtain 20 against the force of the spring 26 from the roller 16 and the spring 28 rolls the curtain 24 onto the roller 18. The operation is reversed when the scanning head 22 is moved leftward. The arrangement comprising the springs 26 and 28 is unsatisfactory for the reasons stated above.

Figure 3:
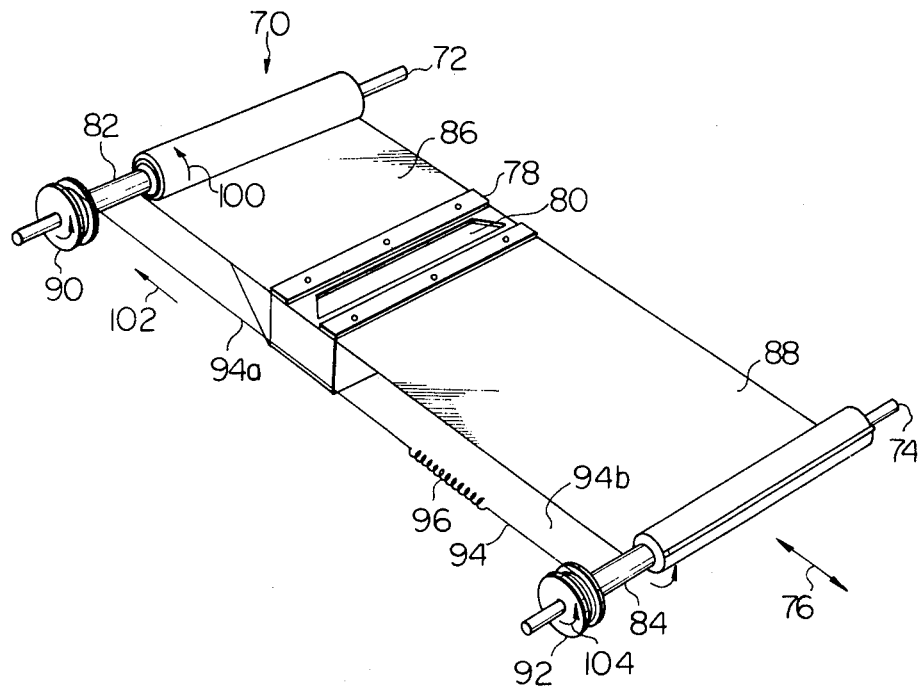
FIG. 3 is a perspective view of a first embodiment of the present invention which constitutes novel improvement over the curtain assembly shown in FIG. 1.

An improved curtain assembly 70 embodying the present invention is shown in FIG. 3 and comprises fixed shafts 72 and 74 extending perpendicular to a scanning direction as indicated by an arrow 76 of a scanning head 78 which is essentially identical to the scanning head 22. The scanning head 78 is provided with an exposure aperture 80. The shafts 72 and 74 are disposed on opposite sides of the scanning head 78 in the direction of the arrow 76. Bored rollers 82 and 84 are rotatably supported by the shafts 72 and 74 respectively. A curtain 86 is fixed at one end to the roller 82 and at the other end to the scanning head 78, the curtain 86 being rolled on the roller 82. A curtain 88 is fixed at one end to the roller 84 and at the other end to the scanning head 78, the curtain 88 being rolled on the roller 84.

Pulleys 90 and 92 are fixed for rotation with the rollers 82 and 84 respectively, and a wire 94 is fixed at its ends to the pulleys 90 and 92. The wire 94 is furthermore rolled on the pulleys 90 and 92 in directions opposite to the directions in which the curtains 86 and 88 are rolled on the rollers 82 and 84 respectively. In this embodiment of the invention, the wire 94 is cut to form two sections 94a and 94b, and a tension spring 96 joins the sections 94a and 94b in such a manner as to tension the wire 94 and curtains 86 and 88.

When the scanning head 78 is moved rightward in FIG. 3, the scanning head 78 unrolls the curtain 86 from the roller 82 in such a manner as to cause the roller 82 to rotate counterclockwise as shown by an arrow 100. This causes the pulley 90 integral with the roller 82 to also rotate counterclockwise and pull the wire 94 leftwardly as indicated by an arrow 102. This causes the pulley 92 and roller 84 integral therewith to rotate counterclockwise as indicated by an arrow 104, rolling the curtain 88 onto the roller 84. The operation is reversed when the scanning head 78 is moved leftwardly, with the scanning head 78 unrolling the curtain 88 from the roller 84 and causing the curtain 86 to be rolled onto the roller 82.

The length of the spring 96 changes only slightly to compensate for the amount of wire 94 rolled on the pulleys 90 and 92 during the operation of the curtain assembly 70, and the spring 96 therefore has a very long service life. The force applied by the spring 94 to the curtains 86 and 88 may be significantly reduced compared to the prior art curtain assembly 10 and selected at an optimum value to prolong the life of the curtains 86 and 88. The curtain assembly 70 is easy and fast to manufacture and assemble on a commercial production basis since the spiral springs 26 and 28 are eliminated. The local stresses on the shafts 72 and 74 and rollers 82 and 84 are also greatly reduced over the prior art, providing in general an extremely durable assembly.

Figure 4:
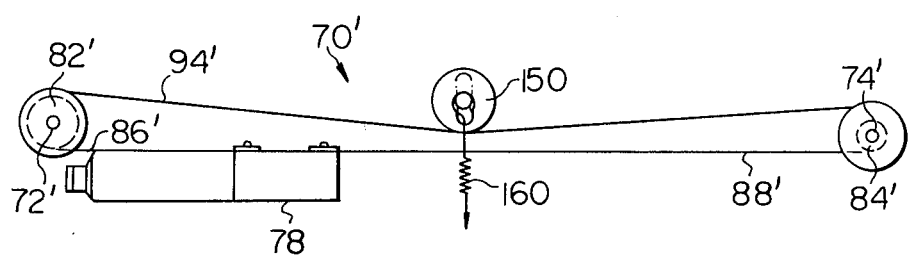
FIG. 4 is a schematic view of a second embodiment of the present invention.

FIG. 4 illustrates a second embodiment of the curtain assembly which is designated as 70', in which like elements are designated by the same reference numerals suffixed by a prime. In this embodiment, the wire 94' is not cut and is rolled on the rollers 82' and 84' with a small amount of slack. A pulley 150 is urged by a tension spring 160 downwardly into perpendicular engagement with the wire 94 to apply a biasing force to the wire 94'. This force takes the slack out of the wire 94', curtains 86' and 88' and tensions the same. The operation is identical to the embodiment shown in FIG. 3. In the embodiment of FIG. 3 it is desirable to construct the assembly 70 so that the spring 96 is not rolled onto one of the pulleys 90 and 92 during the operation of the assembly 70. The embodiment of FIG. 4 is advantageous in that this precaution is eliminated since the spring 96 is not provided.

Various modifications are possible for those skilled in the art within the scope of the present invention. For example, the shafts 72 and 74 may be made integral with the rollers 82 and 84, the integral units being rotatably supported.

What is claimed is:

1. A curtain assembly for a reciprocating optical scanning head, comprising;
    first and second rollers extending perpendicular to a direction of reciprocation of the scanning head and disposed on opposite sides of the scanning head in said direction respectively;
    a first curtain fixed at opposite ends to the first roller and the scanning head respectively, the first curtain being rolled around the first roller;
    a second curtain fixed at opposite ends to the second roller and the scanning head respectively, the second curtain being rolled around the second roller;
    first and second pulleys fixed for rotation with the first and second rollers respectively;
    a wire fixed at opposite ends to the first and second pulleys and being rolled around the first and second pulleys in directions opposite to directions in which the first and second curtains are rolled around the first and second rollers respectively; and
    biasing means for tensioning the wire.

2. A curtain assembly as in claim 1, in which the biasing means comprises means for applying a force to the wire perpendicular thereto.

3. A curtain assembly as in claim 2, in which said means comprises a pulley.

4. A curtain assembly as in claim 3, in which said means further comprises a spring to apply said force to the pulley.

5. A curtain assembly as in claim 1, in which the wire is formed in two sections, the biasing means comprising a tension spring connecting the two sections.

6. A curtain assembly as in claim 1, in which the rollers are formed with first and second longitudinal bores, the assembly further comprising first and second fixed shafts extending through the first and second bores to rotatably support the first and second rollers respectively.

* * * * *